Sept. 7, 1965 P. C. SORENSON ETAL 3,204,452
MILES PER GALLON METER
Filed April 14, 1960 3 Sheets-Sheet 1
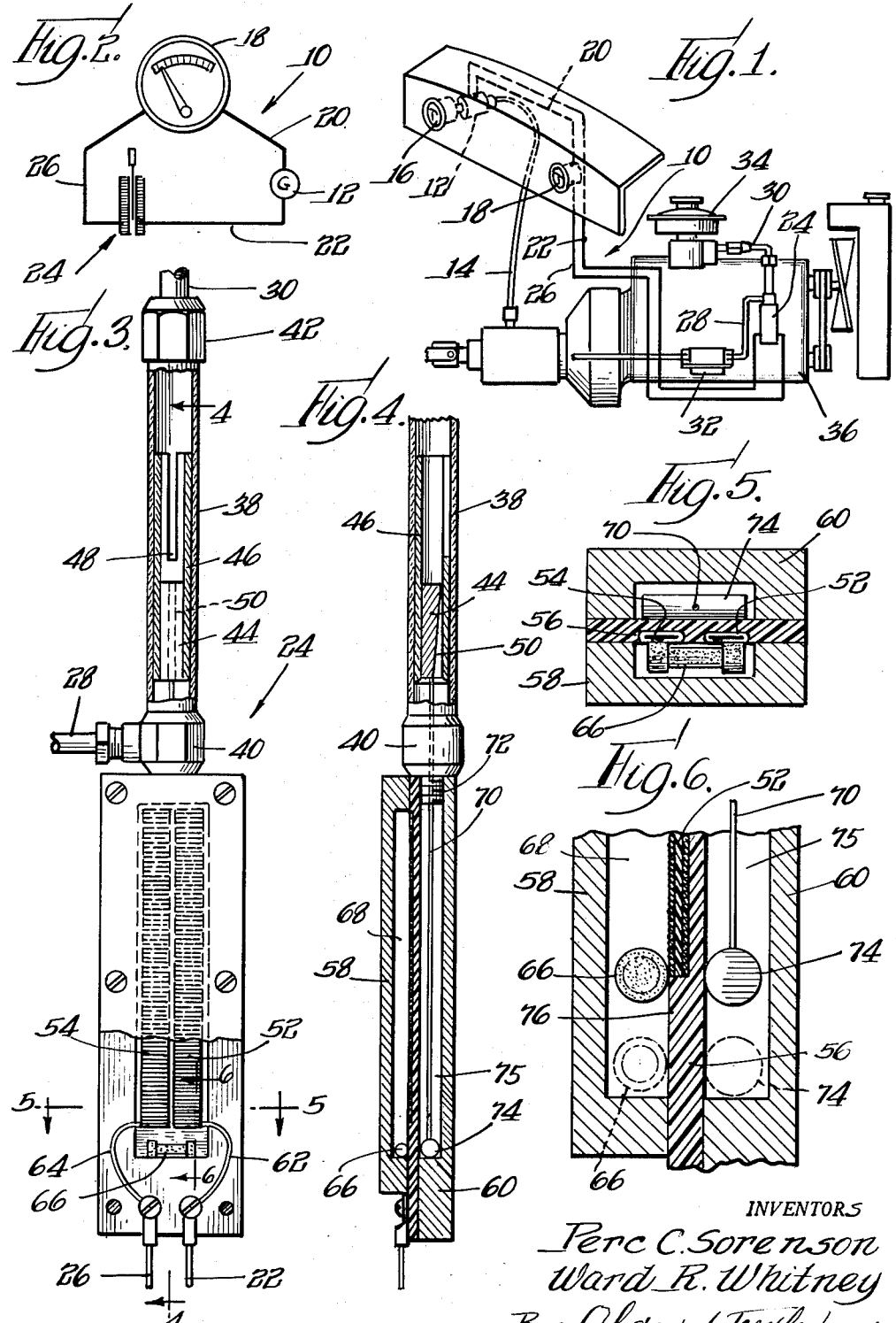
INVENTORS
Perc C. Sorenson
Ward R. Whitney
By: Olson & Trexler attys

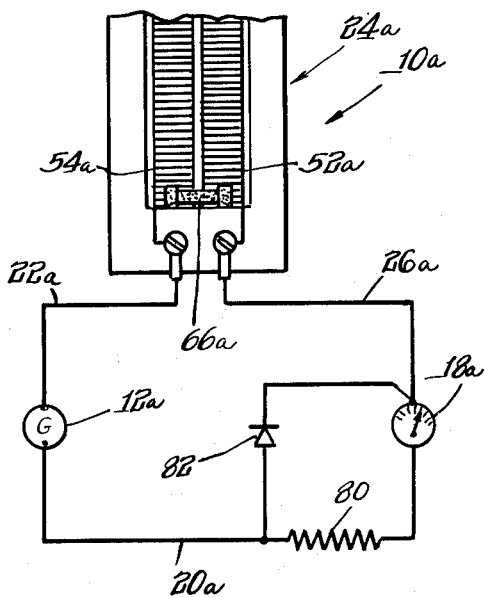
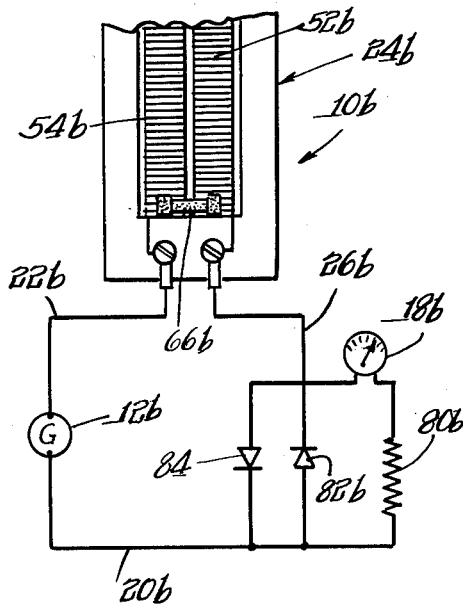
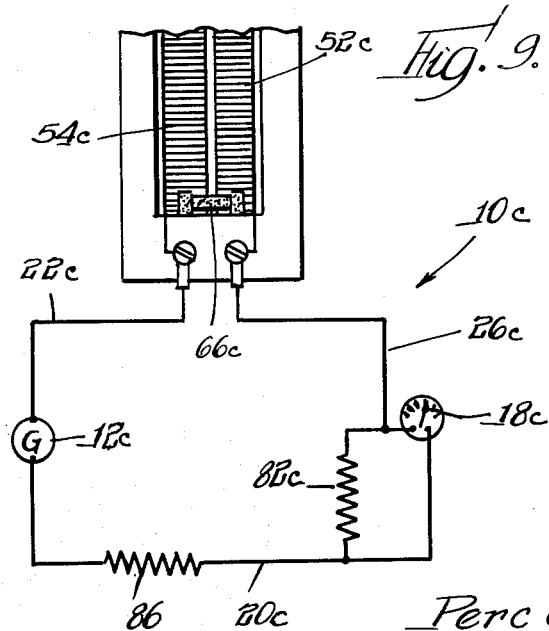

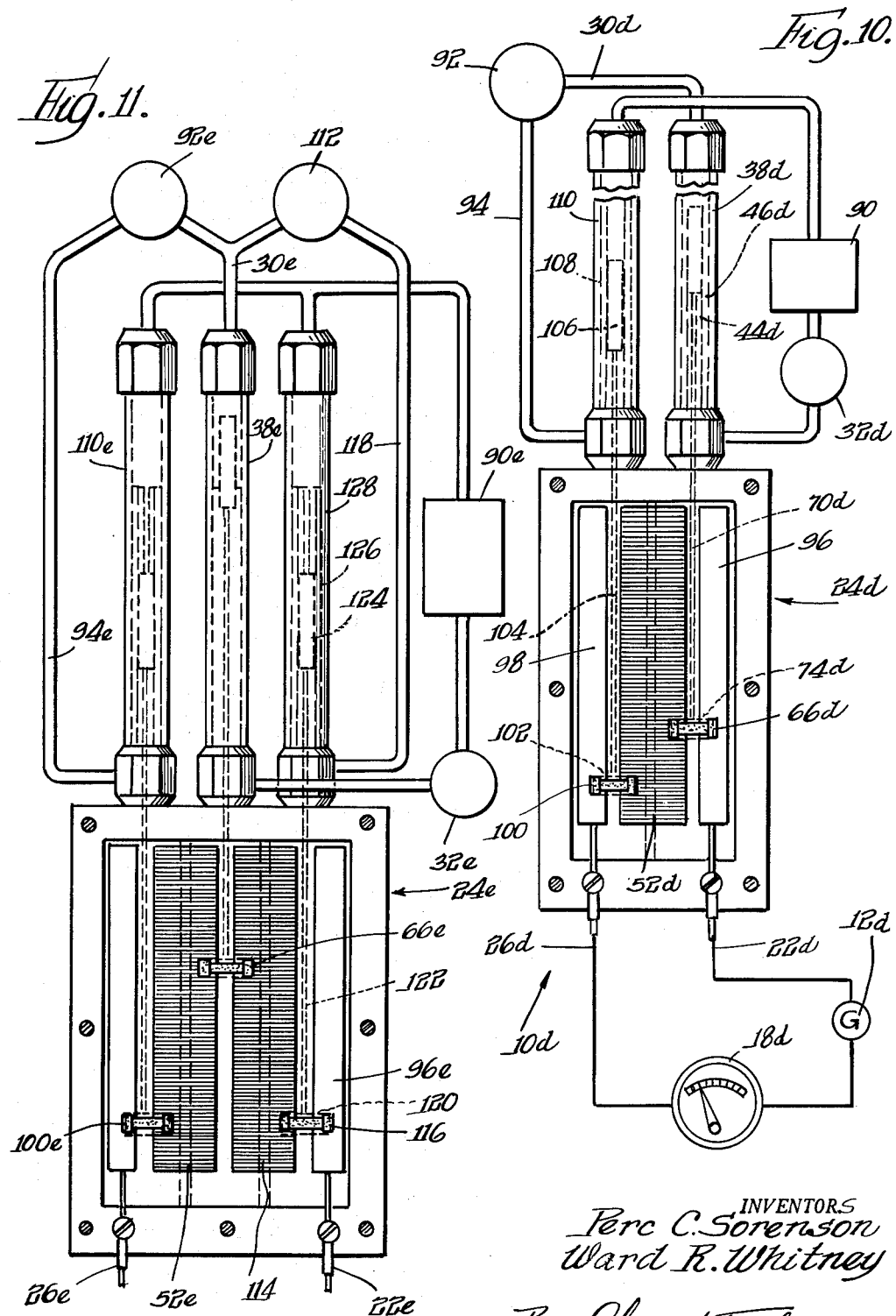

United States Patent Office 3,204,452
Patented Sept. 7, 1965

3,204,452
MILES PER GALLON METER
Perc C. Sorenson and Ward R. Whitney, both of
7617 W. State St., Wauwatosa, Wis.
Filed Apr. 14, 1960, Ser. No. 22,319
8 Claims. (Cl. 73—114)

This application relates to a novel instrument for testing the efficiency of an engine in a vehicle such as an automobile, truck, boat, airplane and the like, and more specifically, the present invention concerns an improved miles per gallon meter.

In copending application for United States Patent Serial No. 826,251, filed July 10, 1959, there is disclosed a miles per gallon determining apparatus or meter which, in at least one form, includes means of providing or generating electrical energy in response to vehicle or engine speed, variable resistance means responsive to fuel flow to the engine for modifying the electrical energy, and a meter responsive to the modified electrical energy for indicating miles per gallon. The apparatus as disclosed in the aforementioned application has, in general, been found to be highly satisfactory. The present invention does, however, contemplate a further improvement of the apparatus.

It has been found that when an automobile having a miles per gallon instrument of the above described type installed therein is driven in a certain manner, the meter will provide readings which are of little practical value to and may tend to mislead an observer even though such readings are correct. For example, when the automobile is moving slowly and the driver suddenly depresses the accelerator a substantial amount, the fuel pump immediately delivers gasoline to the carburetor at a faster rate than it can be used so that the float valve in the carburetor closes momentarily stopping all flow of gasoline to the carburetor. The fuel flow responsive variable resistance device of the previous miles per gallon apparatus correctly senses the flow stoppage and reduces the resistance in the circuit to a point where the meter indicates that an infinite number of miles per gallon of gas is obtained. Such a reading is, as a practical matter, meaningless. It is also noted that when the resistance of a circuit is reduced in the manner just described, there is a possibility of overloading and injuring the electrical energy responsive meter.

It is an important object of the present invention to provide a novel miles per gallon instrument of the above described type which is constructed so as to eliminate any possibility of overloading of and injury to the electrical energy responsive meter as a result of a decrease in or the absence of fuel flow.

Another object of the present invention is to provide a novel miles per gallon instrument of the above described type which is constructed so as to minimize or eliminate undue surges in the reading or indication provided by the electrical energy responsive meter.

A more specific object of the present invention is to provide a novel miles per gallon instrument having the characteristics mentioned in the preceding paragraph in a simple, substantially fool proof manner and without adding to the cost of the structure.

A further object of this invention is to provide a novel miles per gallon instrument which will enable the meter to operate when fuel flow is sharply reduced or eliminated, while at the same time overloading of the meter is prevented.

Another object of this invention is to provide an apparatus of the above described type which may be used in installations having fuel injection or similar systems wherein a portion of the fuel is recirculated.

Other objects and advantages of the present invention will become apparent from the following description and the accompanying drawings wherein:

FIG. 1 is a diagrammatic view showing a miles per gallon instrument constructed in accordance with the present invention installed in a vehicle;

FIG. 2 is a schematic view of an instrument incorporating features of the present invention;

FIG. 3 is an enlarged elevational view, partially broken away, of a fuel flow responsive variable resistance device included in the apparatus and constructed in accordance with the improvements provided by the present invention;

FIG. 4 is a fragmentary sectional view taken along line 4—4 in FIG. 3;

FIG. 5 is an enlarged sectional view taken along line 5—5 in FIG. 3;

FIG. 6 is an enlarged fragmentary sectional view taken along line 6—6 in FIG. 3;

FIG. 7 is a schematic view showing an instrument embodying a modified form of the invention;

FIGS. 8 and 9 are similar to FIG. 7 but respectively show additional forms of the invention;

FIG. 10 is a simplified view showing another form of the present invention which is particularly suitable for use in installations using a fuel injection system; and FIG. 11 is a view similar to FIG. 10, showing a further modification of the invention.

Referring now more specifically to the drawings wherein like parts are designated by the same numerals throughout the various figures, a miles per gallon instrument 10 incorporating features of the present invention is shown in FIGS. 1 and 2. The instrument comprises a small electrical generator 12 which is adapted to be driven by a drive cable 14 for a standard automobile speedometer 16. As indicated in FIG. 1, the generator may be mounted conveniently between the drive cable and the speedometer. The instrument 10 also includes an electrical energy responsive meter 18 which is preferably a milliamperes meter. The meter 78 is energized in the manner described below and is calibrated so as to provide a direct indication or reading of miles per gallon.

The generator 12 has one lead connected with the meter 18 by a wire 20 and another lead connected by wire 22 with a device 24 constructed in accordance with the present invention and responsive to fuel flow to the engine for modifying the output of the generator 12 to enable the meter 18 to indicate miles per gallon. The device 24 is also connected with the meter 18 by a wire 26. As shown in FIG. 1, the device 24 is connected between sections 28 and 30 of a fuel line extending between a fuel pump 32 and a carburetor 34 associated with the vehicle engine 36.

As shown in FIGS. 3 and 4, the device 24 comprises a tube 38 having fittings 40 and 42 at its opposite ends to which the corresponding gas line sections 28 and 30 are connected. A float member 44 is disposed within the tube 38 for floating movement with fuel flowing through the tube, and a sleeve 46 is fixed within the tube 38 and slidably receives the float 44.

The sleeve 46 is formed with an elongated orifice slot 48. In addition, the float member is formed with a tapering slot 50, which is aligned with the orifice slot 48. When there is no fuel flow through the tube 38 and to the carburetor, the float drops to the position shown in FIGS. 3 and 4, so that its upper end is below the lower end of the slot 48 and the sleeve is effectively completely blocked. When fuel flow to the engine is started, the float member rises until the tapering slot 50 registers with the slot 48 to provide an orifice through which the fuel may flow. As will be understood, the effective size of the orifice will vary in accordance with the position of the float member as a result of the inclined or tapering formation of the bottom of the slot 50. Thus, as the rate of fuel flow varies, the position of the float member will vary until the effective size of the orifice causes the fluid pressure to balance and support the float.

As indicated above, the device 24 includes means for modifying the electrical energy provided by the generator 12. More specifically, resistance coils or elements 52 and 54, are mounted on a divider member 56 which extends between a pair of complementary housing members 58 and 60 as shown in FIGS. 3–6. The resistance element 52 is connected with the wire 22 by a wire 62 and the resistance element 54 is similarly connected with the wire 26 by wire 64, as shown best in FIG. 3. A generally cylindrical contact element 66 is adapted to roll along and connect the resistance elements 52 and 54 in the manner described below.

The housing member 58 provides a chamber 68 in which the rolling contact member 66 is free to move along the resistance elements. As shown best in FIG. 6, the lower end of the chamber 68 extends below the lowermost ends of the resistance elements 52 and 54. Thus, under certain circumstances as described in detail below, the contact element 66 may move below the lower ends of the resistance elements and become disengaged from the resistance elements. When this occurs the electrical circuit is opened and the generator is electrically disconnected from the meter 18 so that no reading is obtained.

Means is provided for positioning the contact element 66 along the resistance coils in accordance with the position of the float 44. More specifically, an elongated connecting element or wire 70 is fixed to the lower end of the float 44 and extends downwardly through a passageway 72 communicating with the lower end of the fitting 40. The lower end of the connecting element 70 is fixed to a permanent magnet 74 disposed transversely within a chamber 75 provided between the housing member 60 and the wall or plate member 56. The chamber 75 is hermetically sealed so that there can be no possible contact between the gasoline or fuel and the electrical components of the apparatus.

The contact element 66 which is formed from magnetic material and may be permanently magnetized, is attracted by the magnet 74 and held against the resistance elements 52 and 54 or the surface 76 of the wall member 56, depending upon the position of the magnet 74. As shown best in FIG. 6, the resistance elements are preferably disposed so that their outer surfaces are substantially coplanar with surface 76 so that there will be no tendency for the contact element 66 to stick as it rolls onto or off of the lower end portions of the resistance coils. Preferably, the contact element 66 is plated with copper or the like so as to enhance the electrical connection between it and the resistance elements.

With the structure described above, the float 44 will be located at the lower end of the tube 46 when no fuel is flowing to the engine so that the magnet 74 and the magnetic contact element 66 will be located in the lowermost broken line positions shown in FIG. 6. With the contact element 66 in this position, the circuit is open so that no reading will be obtained on the meter 18. This feature prevents unrealistic readings on the meter and also eliminates the possibility of overloading of the meter in the event the generator 12 is being driven while there is less than a predetermined amount of fuel flow to the engine. For example, the generator might be driven at a relatively high speed while the vehicle is coasting or traveling down a hill in a manner which would cause the use of little or no gasoline. Another instance when the fuel flow might be substantially stopped even though the vehicle is moving, is when the throttle is quickly opened to accomplish rapid acceleration while the vehicle is traveling at a relatively slow speed. Under these conditions it frequently occurs that the fuel pump initially delivers gasoline to the carburetor faster than the fuel can be used by the engine so that the float valve in the carburetor becomes at least momentarily closed to cut off delivery of fuel from the pump.

Under the abnormal driving conditions mentioned in the preceding paragraph, no true test of engine efficiency can be obtained so that the arrangement described above which disconnects the meter cause the meter to provide an indication of miles per gallon substantially only when the reading will be significant. For example, in many installations the resistance coils and contact actuating float structure are arranged so that the contact is disengaged from the coils and the circuit is open when fuel flow falls below about one-half gallon per hour since standard automobile engines receiving less fuel are operating at such a low fraction of their capacity that any reading as to engine efficiency miles per gallon would have little meaning.

In certain installations it may be desirable to permit the meter to remain electrically connected with the generator during the above discussed abnormal driving conditions so as to indicate a substantially infinite number of miles per gallon and thereby advise the operator that little or no gasoline is being used. At the same time the present invention contemplates that the apparatus will be provided with means for preventing overloading of and injury to the meter. FIGS. 7, 8 and 9 show various modified forms of the apparatus for accomplishing these results.

Referring particularly to FIG. 7, there is shown an apparatus which is similar to the above described apparatus 10 as indicated by the application of identical reference numerals with the suffix added to corresponding parts. In this embodiment the device 24a differs only in that the resistance elements 52a and 54a are extended so that the element 66a always maintains electrical contact therewith even when the element is at its lowermost position. When the contact element 66a is in its lowermost position all of the resistance is removed from the circuit except for a relatively low fixed resistance element 80. If desired the resistance element 80 could be provided by extending the lower ends of one or both of the resistance elements 52a and 54a below the lowest possible position on the contact element 66a.

In order to prevent overloading of and injury to the meter 18a, a regulational device 82 is bridged across the meter in the manner shown. In this embodiment the regulator device is a semi-conductor diode of known construction. Such a device has the characteristic of decreasing in resistance upon an increase in the applied voltage so that it is adapted to draw a progressively greater proportion of current relative to the meter so as to prevent overloading of the meter.

FIG. 8 shows an embodiment which is similar to the structure shown in FIG. 7 as indicated by the application of identical reference numerals with a suffix *b* added to corresponding elements. This embodiment differs only in that a second semiconductor diode 84 is bridged across the meter and is arranged with its polarity the reverse of the diode 82b. This additional regulator provides protection for the meter against reverse polarity of the supply voltage which might occur as a result of incorrect installation or when the automobile is driven backward rapidly.

FIG. 9 shows another slightly modified form of the invention similar to the embodiments shown in FIGS. 7 and 8 as indicated by the application of identical reference numerals with the suffix *c* added to corresponding elements. In this embodiment the semi-conductor diode is replaced by a thermistor 82c which is bridged across the meter. As will be understood, the resistance of the thermistor 82c also decreases as it is heated upon the application of higher voltages. Preferably another substantially identical thermistor 86 is connected in series with the meter and with the thermistor 82c. This thermistor serves to compensate for any change in the temperature of and therefore the resistance of the thermistor 82c as a result of causes other than the applied voltage. It will be appreciated that the construction of the various circuits utilizing power regulators bridged across the meter is such that substantially only sufficient current for obtaining a maximum reading is allowed to pass through the meter while any overload is absorbed by the regulator.

FIG. 10 shows an apparatus similar to those described above as indicated by the application of identical reference numerals with the suffix $d$ added to corresponding parts. This apparatus differs in that it is especially adapted for providing an indication responsive to two rates of fluid flow, and more specifically the apparatus is especially adapted for use in association with diesel or other engines utilizing a fuel injection system rather than a carburetor. As shown in simplified form in the drawing, such a system comprises a pump 32d for delivering fuel from a supply tank 90 through the device 24d to a fuel injection pump 92 of known construction. As will be understood, the pump 32d is adapted to deliver a greater volume of fuel to the injection pump 92 than the engine can use and therefore, a fuel return conduit 94 is connected to and extends from the injection pump.

The device 24d is similar to the device 24 described above except that it is adapted to vary the resistance in connected in the fuel line 30d between the pump 32d and also in accordance with fuel flow from the fuel injection pump and back to the supply tank. In order to accomplish this, the device 24d is provided with a single centrally located elongated resistance element 52d and elongated contact plates 96 and 98 insulated from and extending along opposite sides of the resistance element 52d and respectively connected to the wires 22d and 26d. A contact element 66d is adapted to roll along the resistance element 52d and the elongated contact 96, and means are provided for actuating the contact element 66d which are substantially identical to the means for actuating the contact element 66 described above. Thus, tube 38d is connected in the fuel line 30d between the pump 32d and the fuel injector pump 92. A slotted sleeve 46d is disposed within the tube for slidably accommodating a slotted float 44d. A connecting element or wire 70d extends from the float 44d and is connected with a magnet 74d which controls the contact element 66d.

The device 24d is provided with means essentially identical to the above mentioned flow responsive float and associated magnet and electrical contact elements for varying the resistance in the meter circuit in accordance with the flow of excess fuel from the fuel injector pump through the return line 94 and back to the supply tank 90. This means includes a contact element 100 identical to the element 66d and disposed for engagement with the elongated contact strip 98 and the resistance element 52d. As before the contact element 100 is positioned by means of a permanent magnet 102 which is secured to a connecting element or wire 104 which extends upwardly and is connected to a float 106 which is identical to the above mentioned float 44d. The float 106 is disposed within a sleeve 108 which in turn is disposed in a tube 110 connected in the return fuel line 94, which sleeve and tube are identical to the sleeve 46d, and tube 38d described above.

The device 24d functions in much the same manner as the corresponding devices described above. Thus the contact element 66d is positioned to increase or decrease the resistance in the meter circuit in accordance with the rate of fuel flow to the fuel injector pump 92. However, the amount of fuel consumed by the engine is the difference between the fuel delivered to the injector pump through the supply line 30d and the fuel flowing from the pump 92 through the return line 94. This difference is, in effect, measured by positioning the contact element 100 relative to the contact element 66d in accordance with fuel flow through the return line 94 whereby the total resistance introduced into the meter circuit is that portion of the resistance element 52d between the contact elements 66d and 100.

FIG. 11 shows another embodiment of the present invention similar to the embodiment shown in FIG. 10, as indicated by the application of identical reference numerals with the suffix $e$ added to corresponding elements. While the generator and meter members are not shown in this figure, it is to be understood that such devices are included in the embodiment of FIG. 11. Thus, the structure of FIG. 11 differs from the FIG. 10 structure only in that the device 24e is constructed for installation in a system utilizing two fuel injection pumps 92e and 112. In order to accomplish this another resistance element 114 is provided, which resistance element is located between the element 52e and the elongated contact strip or bar 96e. The adjustable contact 66e is disposed for engaging the resistance elements 52e and 114, and a third adjustable contact 116 which is identical to the contact 66e is arranged for bridging the gap between the resistance element 114 and the contact strip 96e. As before, the contact element 66e is actuated in accordance with fuel flow to the fuel injector pumps and the contact element 100e is actuated in accordance with fuel returning through the line 94e from the fuel injector pump 92e. The contact element 116 is actuated in the same manner as the contact element 100e except that it is responsive to fuel returning through line 118 from the fuel injector pump 112. Thus, a permanent magnet 120 is provided in association with the magnetic contact 116, which magnet is connected by element 122 with a float 124 operable within a slotted sleeve 126 disposed in a tube 128 connected in the return fuel line 118. As previously indicated, the magnet 120, float 124, sleeve 126 and tube 128 are identical to the corresponding elements which have previously been described.

While the preferred embodiments of the present invention have been shown and described herein, it is obvious that many structural details may be changed without departing from the spirit and scope of the appended claims.

The invention is claimed as follows:

1. A miles per gallon apparatus comprising an electrical circuit, generator means connectable in a vehicle speedometer drive for causing electricity to flow in said circuit in accordance with a speed factor, electrical meter means in said circuit for indicating miles per gallon, tube means connectable in a vehicle fuel line, float means including an element of magnetic material movable in said tube means in accordance with fuel flow, means external of and sealed from said tube means electrically connecting said meter means and said generator means and including an element magnetically coupled to and movable with said first mentioned element for modifying the flow of electricity in said circuit in accordance with fuel flow to enable the meter means to indicate miles per gallon and also for preventing overloading of the meter means when the fuel flow to the vehicle engine is less than a predetermined amount, said last named means comprising fixed resistance means and variable resistance means, said variable resistance means including said second mentioned movable element and being variable in accordance with movements of said element.

2. A miles per gallon apparatus comprising means for generating electrical energy in accordance with vehicle speed, electrical meter means for indicating miles per gallon, upstanding tube means connectable in a vehicle fuel line for being completely filled with fuel, float means including an element of magnetic material movable in said tube means, said float means and tube means defining a variable orifice which changes in effective size upon movement of the float means, said float means being movable in response to variations in fluid pressure accompanying variations in fuel flow, and electrical means external of and sealed from said tube means electrically connecting said meter means and said generating means and responsive to movement of said element for modifying electrical energy provided by said generating means and in accordance with fuel flow for enabling the meter to indicate miles per gallon and also for preventing overloading of the meter when the fuel flow through the vehicle engine is less than a predetermined amount, said electrical means comprising means for electrically disconnecting the meter means from the generating means and thereby preventing overloading of the generating means when the fuel flow is less than a predetermined value.

3. A miles per gallon apparatus comprising means for generating electrical energy in accordance with vehicle speed, electrical meter means for indicating miles per gallon, upstanding tube means connectable in a vehicle fuel line for being completely filled with fuel, float means including an element of magnetic material movable in said time means, said float means and tube means defining a variable orifice which changes in effective size upon movement of the float means, said float means being movable in response to variations in fluid pressure accompanying variations in fuel flow, and electrical means external of and sealed from said tube means electrically connecting said meter means and said generating means and responsive to movement of said element for modifying electrical energy provided by said generating means and in accordance with fuel flow for enabling the meter to indicate miles per gallon and also for preventing overloading of the meter when the fuel flow through the vehicle engine is less than a predetermined amount, said electrical means comprising a power regulator device bridged across meter means for absorbing excess power delivered by said generating means.

4. An apparatus, as defined in claim 3, wherein said power regulator device comprises a semi-conductor diode.

5. An apparatus, as defined in claim 3, wherein said power regulator device comprises thermistor means.

6. A miles per gallon apparatus comprising means for generating electrical energy in accordance with vehicle speed, electrical meter means for indicating miles per gallon, upstanding tube means connectable in a vehicle fuel line for being completely filled with fuel, float means including an element of magnetic material movable in said tube means, said float means and tube means defining a variable orifice which changes in effective size upon movement of the float means, said float means being movable in response to variations in fluid pressure accompanying variations in fuel flow, and electrical means external of and sealed from said tube means electrically connecting said meter means and said generating means and responsive to movement of said element for modifying electrical energy provided by said generating means and in accordance with fuel flow for enabling the meter to indicate miles per gallon and also for preventing overloading of the meter when the fuel flow through the vehicle engine is less than a predetermined amount said tube means including a first tube for fuel flowing for delivery to the engine and a second tube for a second flow of fuel which is in excess of the needs of the engine and is recirculated, said float means including magnetic elements in both of said tubes, and said means external of said tube means includes separate elements respectively magnetically coupled with said float means elements for modifying electrical energy provided by said generating means in accordance with the difference between said first mentioned fuel flow and said second mentioned fuel flow to enable the meter to indicate miles per gallon and also for preventing overloading of the meter when said first mentioned fuel flow is less than a predetermined amount.

7. An apparatus, as defined in claim 6, wherein said means external of said tube means comprises a resistance element, said separate elements comprising a first contact element movable along said resistance element in accordance with the movement of one of said float elements, and a second contact element movable along said resistance element in accordance with the movements of said other float element.

8. An apparatus, as defined in claim 7 and especially suitable for installation in a system utilizing first and second fuel injector pumps and the like, wherein said means externally of said tube means includes a second resistance element, said first contact element extending between said first mentioned and said second resistance elements, a third contact element movable along said second resistance element, said float element responsive to said first mentioned fuel flow being connectable with both of said first and second fuel injector pumps, said the other of said float elements being connectable with said first fuel injector pump, and another means connectable with said second fuel injector pump and responsive to fuel being recirculated from said second fuel injector pump and magnetically connected with said third contact element for moving said third contact element along said second resistance element.

References Cited by the Examiner

UNITED STATES PATENTS

| 1,754,039 | 4/30 | Pawlick et al. | 73—114 |
| 1,917,974 | 7/33 | Inglis et al. | 73—114 X |
| 2,250,125 | 7/41 | Chisholm | 73—114 |
| 2,284,423 | 5/42 | Hansell | 324—126 X |
| 2,304,822 | 12/42 | Harrison et al. | 73—114 |
| 2,372,166 | 3/45 | McCarty | 73—208 |
| 2,459,689 | 1/49 | Dickey et al. | 73—208 |
| 2,707,395 | 5/55 | Morschel | 73—290.1 |

FOREIGN PATENTS

| 828,920 | 3/38 | France. |

RICHARD C. QUEISSER, Primary Examiner.

CHARLES A. CUTTING, ROBERT L. EVANS, JOSEPH P. STRIZAK, Examiners.

UNITED STATES PATENT OFFICE
CERTIFICATE OF CORRECTION

Patent No. 3,204,452                        September 7, 1965

Perc C. Sorenson et al.

It is hereby certified that error appears in the above numbered patent requiring correction and that the said Letters Patent should read as corrected below.

Column 4, line 9, for "cause" read -- causes --; column 5, line 28, for "connected in the fuel line 30d between the pump 32d" read -- accordance with fuel flow to the fuel injection pump --; column 7, line 34, after "across" insert -- said --.

Signed and sealed this 7th day of February 1967.

EAL)

test:

\NEST W. SWIDER                             EDWARD J. BRENNER testing Officer                                   Commissioner of Patents